United States Patent
Wu et al.

(10) Patent No.: US 10,733,743 B2
(45) Date of Patent: Aug. 4, 2020

(54) OBJECT DISPLACEMENT DETECTION METHOD FOR DETECTING OBJECT DISPLACEMENT BY MEANS OF DIFFERENCE IMAGE DOTS

(71) Applicant: QISDA CORPORATION, Taoyuan (TW)

(72) Inventors: Po-Fu Wu, New Taipei (TW); Yi-Chen Ho, Hsinchu (TW)

(73) Assignee: Qisda Corporation, Taoyuan (TW)

( * ) Notice: Subject to any disclaimer, the term of this patent is extended or adjusted under 35 U.S.C. 154(b) by 29 days.

(21) Appl. No.: 15/987,876

(22) Filed: May 23, 2018

(65) Prior Publication Data
US 2019/0043206 A1    Feb. 7, 2019

(30) Foreign Application Priority Data

Aug. 3, 2017    (CN) .......................... 2017 1 0657081

(51) Int. Cl.
*G06T 7/254*     (2017.01)
*G08B 13/196*    (2006.01)
*G06T 11/20*     (2006.01)

(52) U.S. Cl.
CPC .............. *G06T 7/254* (2017.01); *G06T 11/20* (2013.01); *G08B 13/19606* (2013.01); *G08B 13/19691* (2013.01); *G06T 2207/10016* (2013.01); *G06T 2207/30196* (2013.01); *G06T 2207/30232* (2013.01)

(58) Field of Classification Search
CPC .......... G06T 7/254; G06T 2207/10016; G08B 13/19606; G08B 13/19691
See application file for complete search history.

(56) References Cited

U.S. PATENT DOCUMENTS

2006/0038114 A9 *  2/2006  Cofer ..................... G01B 11/25
                                                              250/221
2014/0160113 A1 *  6/2014  Lee ....................... H04N 13/128
                                                              345/419

FOREIGN PATENT DOCUMENTS

| CN | 1506686 A    | 6/2004 |
|----|--------------|--------|
| CN | 102023051 A  | 4/2011 |
| CN | 105225211 A  | 1/2016 |
| JP | H4-178514    | 6/1992 |
| TW | 593982       | 6/2004 |
| TW | 201430721 A  | 8/2014 |

* cited by examiner

*Primary Examiner* — Tsion B Owens

(57) ABSTRACT

An object displacement detection method includes capturing n images of an object for obtaining n sets of image dots, where the object corresponds to an $i_{th}$ set of image dots in an $i_{th}$ image of the n images; performing (n−1) difference calculations using the n sets of image dots to obtain (n−1) sets of difference image dots, where a $j_{th}$ set of difference image dots of the (n−1) sets of difference image dots is generated by performing a $j_{th}$ difference calculation of the (n−1) difference calculations using a $(j+1)_{th}$ set of image dots and a $j_{th}$ set of image dots of the n sets of the image dots; and determining the object has displaced when a sum of numbers of the (n−1) sets of difference image dots reaches a first threshold.

10 Claims, 4 Drawing Sheets

Time

OBJECT DISPLACEMENT DETECTION METHOD FOR DETECTING OBJECT DISPLACEMENT BY MEANS OF DIFFERENCE IMAGE DOTS

BACKGROUND OF THE INVENTION

1. Field of the Invention

The invention relates to an object displacement detection method, and more particularly, an object displacement detection method used for detecting object displacement by means of difference image dots.

2. Description of the Prior Art

Conventional security monitoring method can detect a large movement of an object. For example, a person who is walking or running can be detected. However, it is relatively difficult to detect a small movement of an object. For example, when an unknown person enters a monitored area, it is difficult for a conventional security method to detect the person's movement if the person intentionally keeps still. Taking a human body as an example, slight vibrations may still occur due to breathing or inevitable slight body movement even if the human body intentionally stays still. However, the probability of false alarms will greatly increase if sending an alarm for every detected slight vibration in a monitored area. Hence, most detected slight vibrations are filtered out as background noise, and the slight vibrations which should be alerted (e.g. the slight body vibrations of an intruder without consent) are likely to be neglected. By means of a specific method such as Eulerian algorithm, transient changes of the position of an object in an image can be amplified to visualize the above mentioned slight movement. However, this sort of method relates to complex calculations and image processing programs, and excessive resource of hardware and software will therefore be consumed. Hence, a better solution is still required in the field.

SUMMARY OF THE INVENTION

An embodiment provides an object displacement detection method. The method includes capturing n images of an object for obtaining n sets of image dots, where the object corresponds to an $i_{th}$ set of image dots in an $i_{th}$ image of the n images; performing (n−1) difference calculations using the n sets of image dots to obtain (n−1) sets of difference image dots, where a $j_{th}$ set of difference image dots of the (n−1) sets of difference image dots is generated by performing a $j_{th}$ difference calculation of the (n−1) difference calculations using a $(j+1)_{th}$ set of image dots and a $j_{th}$ set of image dots of the n sets of the image dots; and determining the object has displaced when a sum of numbers of the (n−1) sets of difference image dots reaches a first threshold.

Another embodiment provides an object displacement detection system for detecting displacement of an object. The system includes an image capture unit, a memory and a processor. The image capture unit is used to capture n images of the object for obtaining n sets of image dots, where the object corresponds to an $i_{th}$ set of image dots in an $i_{th}$ image of the n images. The memory is coupled to the image capture unit and used to store then images and a first threshold. The processor is coupled to the memory and the image capture unit and used to perform (n−1) difference calculations using the n sets of image dots to obtain (n−1) sets of difference image dots and determine whether the object has displaced, where a $j_{th}$ set of difference image dots of the (n−1) sets of difference image dots is generated by the processor by performing a $j_{th}$ difference calculation of the (n−1) difference calculations using a $(j+1)_{th}$ set of image dots and a $j_{th}$ set of image dots of the n sets of the image dots, and the processor determines that the object has displaced when a sum of numbers of the (n−1) sets of difference image dots reaches a first threshold.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
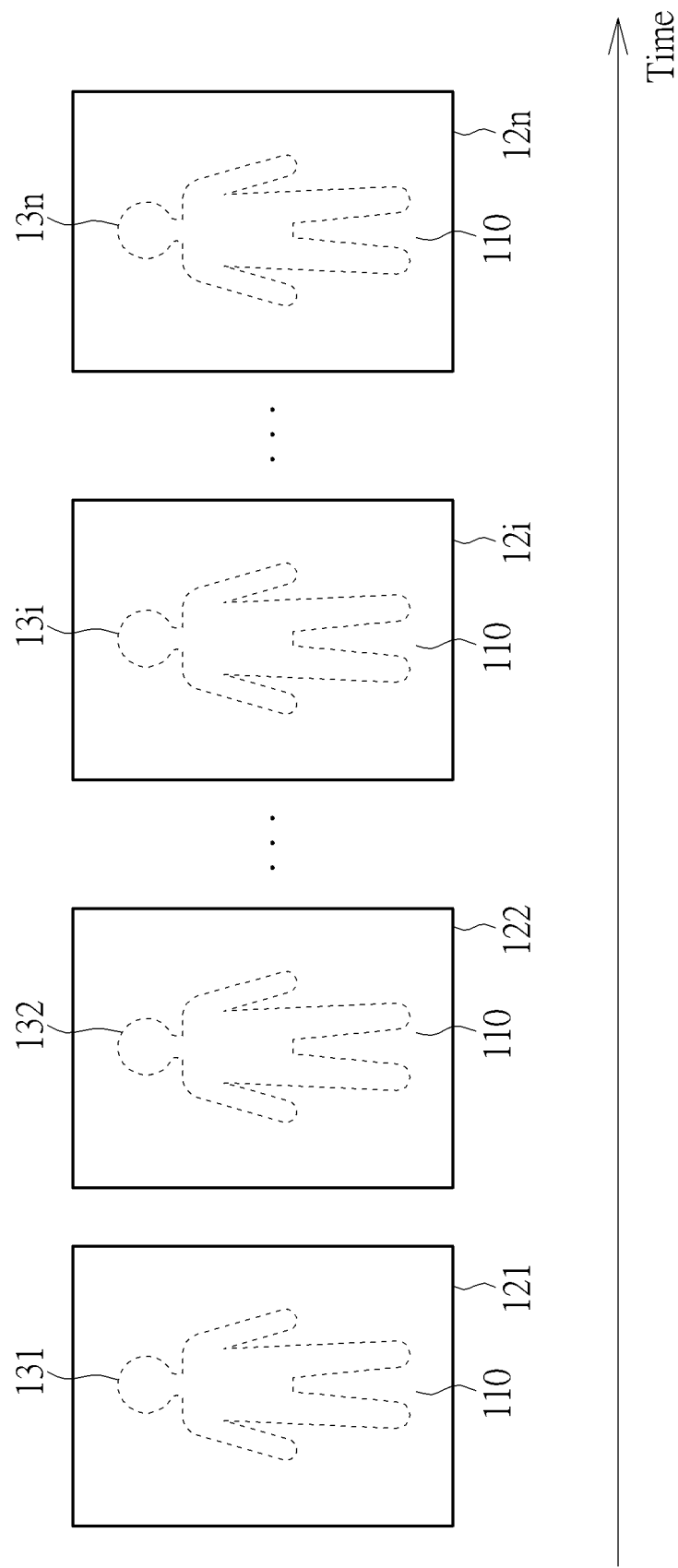
FIG. 1 illustrates that a plurality of images of an object are captured according to an embodiment.

FIG. 1 illustrates that n images 121 to 12n of an object 110 are captured according to an embodiment. For example, the object 110 may be a human body or another detected object. In FIG. 1, n sets of image dots 131 to 13n corresponding to the object 110 may be obtained, where the object 110 may correspond to an $i_{th}$ set of image dots 13i in an $i_{th}$ image 12i. In other words, the $i_{th}$ set of image dots 13i may form the object 110 in the image 12i. The mentioned image dot may be a pixel, or a group of pixels. For example, an image dot may be an array including (but not limited to) 4 pixels. As shown in FIG. 1, the images 121 to 12n may be captured sequentially. The image 121 to 12n may be n frames. For example, if the frame rate is 30 frames per second, 30 images may be captured every second. If the frame rate is lower, for example, 15 frames may be captured to obtain 15 images every second.

Figure 2:
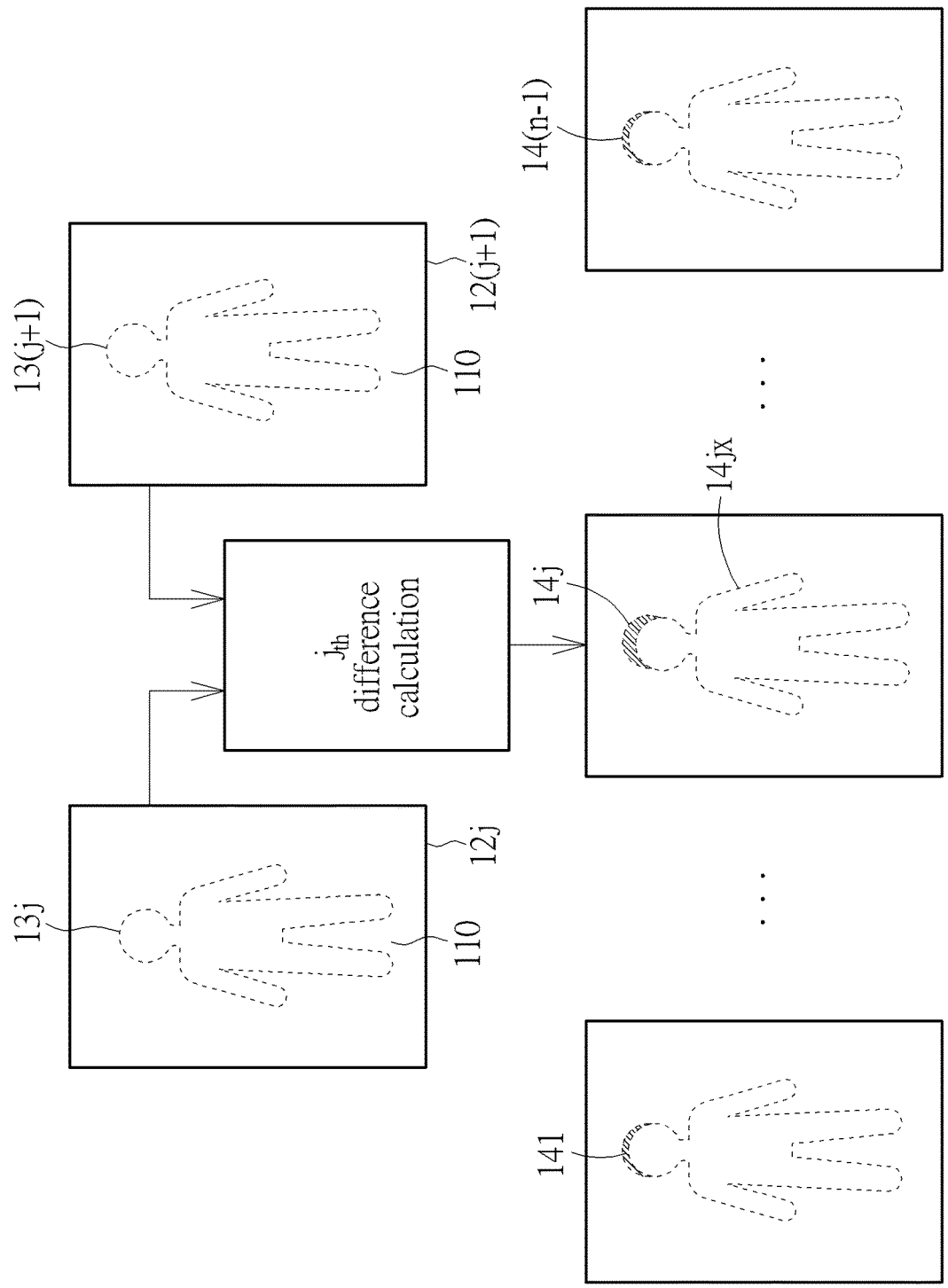
FIG. 2 illustrates that a difference calculation is performed using two images according to an embodiment.

According to an embodiment, (n−1) difference calculations may be performed using the n images 121 to 12n. The images 121 and 122 may be used to perform the $1_{st}$ difference calculation, the images 122 and 123 may be used to perform the $2_{nd}$ difference calculation, and so on. The images 12(n−1) and 12n may be used to perform the $(n−1)_{th}$ difference calculation. FIG. 2 illustrates that a $j_{th}$ difference calculation is performed using images 12j and 12(j+1) according to an embodiment. The object 110 may be formed using a set of image dots 13j in the image 12j, and the object 110 may be formed using a set of image dots 13(j+1) in the image 12(j+1). When the object 110 slightly vibrates or displaces, there is slight difference between the two sets of image dots 13j and 13(j+1). If the two sets of image dots 13j and 13(j+1) are used to perform a difference calculation, image dots substantially stay at the same coordinate location may be eliminated by subtraction. The changes of other image dots changing to substantially different coordinate locations will be obtained by subtraction, and a $i_{th}$ set of difference image dots 14j may be obtained. For example, if the object 110 has a minor displacement, and the displacement causes 155 image dots to shift while other 688 image dots stay still from the image 12j to the image 12(j+1), then the 155 image dots may correspond to the set of difference image dots 14j, and the 688 image dots may correspond to an area 14jx drawn by dotted line. The numbers of image dots mentioned above are only examples but not for limiting the scope of embodiments.

Likewise, by performing (n−1) difference calculations using the images 121 to 12n, (n−1) sets of difference image dots 141 to 14(n−1) may be obtained. Each set of difference image dots may correspond to the displacement of the object 110 between two successive images. According to an embodiment, numbers of the sets of difference image dots 141 to 14(n−1) may be summed up to have a sum. If the sum reaches a first threshold, it may be considered that the movement of the object 110 has exceeded a predetermined range from the image 121 to the image 12n, and it may therefore be determined that the object 110 has displaced. The foresaid variables i, n and j may be positive integers, i≤n, and j+1≤n. According to different applications, when it has been determined that the object 110 has displaced, it may be determined that an intruder without consent has entered a private area, or it may be determined that a patient is still active.

According to an embodiment, the images 121 to 12n may be captured during a first time interval. For example, 300 images may be captured during 10 seconds. If the first time interval has been set, the difference image dots obtained previously may be eliminated after the first time interval has elapsed, and then n new images may be captured for determining whether the object 110 still has a displacement.

According to another embodiment, m images may be captured during a second time interval following the first time interval for determining whether the object 110 has stopped moving. During the second time interval, m images of the object 110 may be captured for obtaining m sets of image dots corresponding to the object 110. In a $p_{th}$ image of the m images, the object 110 may correspond to a $p_{th}$ set of image dots. The m sets of image dots may be used for performing (m−1) difference calculations to obtain (m−1) sets of difference image dots, where a $q_{th}$ set of difference image dots of the (m−1) sets of difference image dots is generated by performing a $q_{th}$ difference calculation of the (m−1) difference calculations using a $(q+1)_{th}$ set of image dots and a $q_{th}$ set of image dots of the m sets of the image dots. It may be determined that the object 110 has not displaced during the second time interval when a sum of numbers of the (m−1) sets of difference image dots fails to reach a second threshold. The foresaid variables p, m and q are positive integers, p≤m, and q+1≤m.

For example, 150 images may be captured during a second time interval (e.g. 5 seconds) following a first time interval (e.g. 10 seconds), and m=150 in this example. By means of the method shown in FIG. 1 and FIG. 2, 149 sets of difference image dots may be obtained. If the sum of numbers of the 149 sets of difference image dots is less than 50, it may be determined that the object 110 has not displaced. In this example, the second threshold is set 50. For example, if it is determined that the object 110 has not displaced, a predetermined operation such as stopping monitoring may be performed.

FIG. 1 and FIG. 2 are for explaining a conceptual principle of the present invention. When performing the method, related calculations and determinations may be performed by a processor. However, according to an embodiment, at least one visual pattern may be displayed on a visual display according to the (n−1) sets of difference image dots 141 to 14n so as to visualize the displacement of the object 110. For example, it is allowed to display the difference image dots on the visual display (e.g. a display panel) for a user to observe the displacement of the object 110. According to an embodiment, k (e.g. 300) sets of difference image dots of the (n−1) sets of difference image dots 141 to 14 (n−1) may be displayed on the visual display during a first time interval (e.g. 10 seconds). Then, the k sets of difference image dots may be eliminated from the visual display after the first time interval has elapsed. The foresaid variable k may be a positive integer and k≤(n−1). For example, the displayed difference image dots may be eliminated every 10 seconds so as to re-accumulate difference image dots. This is for timely updating the visualized displacement of the object 110.

Figure 3:
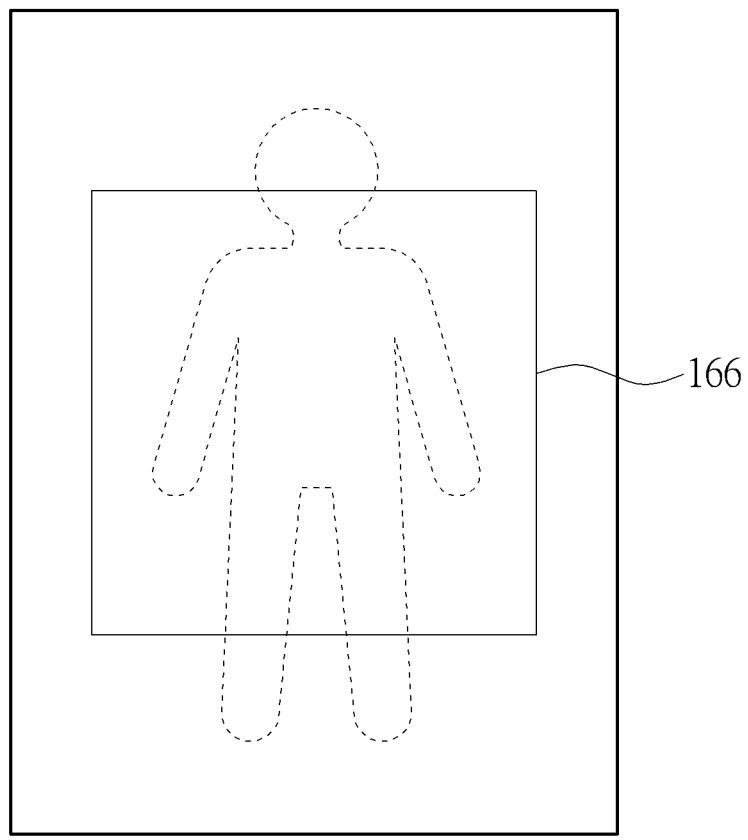
FIG. 3 illustrates that an area is displayed on a visual display according to a plurality of sets of difference image dots according another embodiment.

FIG. 3 illustrates that an area 166 is displayed on a visual display according to the (n−1) sets of difference image dots 141 to 14 (n−1) according another embodiment. The area 166 may highlight the object 110. When a displacement of the object 110 is detected, the area 166 may be displayed to visualize the displacement. The area 166 may have another geometric shape instead of rectangle. For example, the area 166 may be circular, triangular or elliptical. In another example, the area 166 may be formed with a plurality of smaller geometric areas. Using the area 166 may highlight the object 110 and allow a user to clearly view the displacement of the object 110 without being misled by redundant information on a screen.

As mentioned above, the area 166 may be displayed on the visual display according to k (e.g. k=300) sets of difference image dots of the (n−1) sets of difference image dots 141 to 14n during a first time interval (e.g. 10 seconds). The area 166 may be eliminated from the visual display after the first time interval has elapsed. Then, another highlighted area may be displayed again according to the following displacement of the object 110.

According to embodiments, difference image dots or a highlighted area as mentioned above may be displayed according to the displacement of the object 110 during a first time interval (e.g. 10 seconds) to visualize the displacement. Then, m images may be captured during a second time interval (e.g. 5 seconds) following the first time interval for obtaining m (e.g. m=150) sets of image dots. In this way, (m−1) difference calculations may be performed to obtain (m−1) sets of difference image dots. If a sum of numbers of the (m−1) sets of difference image dots fails to reach a second threshold, it may be determined that the object 110 has not displaced during the second time interval, and at least one visual pattern (such as displayed difference image dots or displayed area for highlighting the displacement) may be eliminated accordingly.

Figure 4:
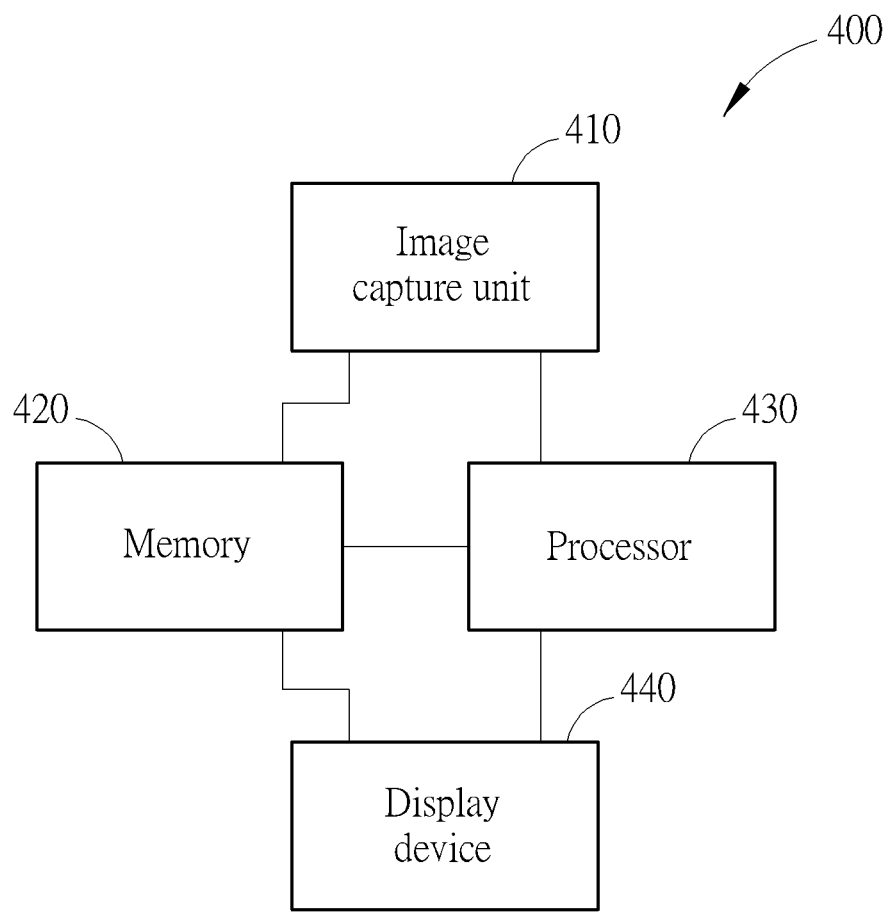
FIG. 4 illustrates an object displacement detection system according to an embodiment.

FIG. 4 illustrates an object displacement detection system 400 according to an embodiment. The system 400 may be used for detecting the displacement of the object 110, and include an image capture unit 410, a memory 420 and a processor 430. The image capture unit 410 may include a camera or a sensor used to capture the abovementioned images 121 to 12n of the object 110 and obtain the n sets of image dots 131 to 13n. The memory 420 may include a random access memory or a flash memory and be coupled to the image capture unit 410 to store the n images 131 to 13n and the foresaid first threshold. The processor 430 may be coupled to the memory 420 and the image capture unit 410. The processor 430 may be used to perform the (n−1) difference calculations using the (n−1) sets of image dots 131 to 13n to obtain the (n−1) sets of difference image dots 141 to 14(n−1), and determine whether the object 110 has displaced by means of the operation described above.

According to another embodiment, the image capture unit 410 may be used to capture the m images mentioned above during the second time interval to obtain m sets of image dots corresponding to the object 110. The memory 420 may further store the second time interval, the m images and the second threshold. The processor 430 may perform the (m−1) difference calculations using the m sets of image dots to obtain the (m−1) sets of difference image dots, and determine whether a sum of numbers of the (m−1) sets of difference image dots reaches the second threshold. If the sum fails to reach the second threshold, the processor 430 may determine that the object 110 has not displaced during the second time interval.

The system 400 may optionally include a display device 440 such as a liquid crystal display or another sort of display device. The display device 440 may be coupled to the memory 420 and the processor 430. The processor 430 may display at least one visual pattern such as the difference image dots or a highlighted area generated according to the difference image dots to visualize the displacement of the object 110 and make it easier for a user to monitor. As described above, it may be set that the visual pattern may be eliminated after the first time interval has elapsed to determine whether the object 110 still has a displacement. According to another embodiment, the visual pattern may be eliminated if the processor 430 determines that the object 110 has not displaced during the second time interval.

By means of the object displacement detection method and system described above, slight vibrations or displacement may be effectively detected. In addition to the field of security monitoring, the method and system may be used to observe activeness of infants, young children or patients lying on bed in the medical field. Because displacement information is obtained by performing difference calculations using a plurality of sets of image dots, and accumulating the obtained different image dots, it may be avoided to use an excessively complex algorithm. Load of a processor may be reduced, and it may be avoided to amplify noise incorrectly. The solution provided by embodiments is more feasible and effective than conventional techniques in the field.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An object displacement detection method comprising:
   capturing n images of an object during a first time interval for obtaining n sets of image dots, wherein each image dot of the n sets of image dots comprises a pixel or a group of pixels generated from the n images and the object corresponds to an $i_{th}$ set of image dots in an $i_{th}$ image of the n images;
   performing (n−1) difference calculations using the n sets of image dots to obtain (n−1) sets of difference image dots, wherein a $j_{th}$ set of difference image dots of the (n−1) sets of difference image dots is generated by performing a $j_{th}$ difference calculation of the (n−1) difference calculations using a $(j+1)_{th}$ set of image dots and a $j_{th}$ set of image dots of the n sets of the image dots;
   determining the object has displaced when a sum of numbers of the (n−1) sets of difference image dots reaches a first threshold;
   capturing m images during a second time interval following the first time interval for obtaining m sets of image dots, wherein each image dot of the m sets of image dots comprises a pixel or a group of pixels generated from the m images and the object corresponds to a $p_{th}$ set of image dots in a $p_{th}$ image of the m images;
   performing (m−1) difference calculations using the m sets of image dots to obtain (m−1) sets of difference image dots, wherein a $q_{th}$ set of difference image dots of the (m−1) sets of difference image dots is generated by performing a $q_{th}$ difference calculation of the (m−1) difference calculations using a $(q+1)_{th}$ set of image dots and a $q_{th}$ set of image dots of the m sets of the image dots; and
   determining the object has not displaced during the second time interval when a sum of numbers of the (m−1) sets of difference image dots fails to reach a second threshold;
   wherein i, n, j, p, m and q are positive integers, i≤n, j+1≤n, p≤m, and q+1≤m.

2. The method of claim 1, further comprising:
   displaying at least one visual pattern on a visual display according to the (n−1) sets of difference image dots.

3. The method of claim 2, wherein the visual pattern is displayed by displaying the (n−1) sets of difference image dots on the visual display.

4. The method of claim 2, wherein displaying the at least one visual pattern on the visual display according to the (n−1) sets of difference image dots comprises:
   displaying k sets of difference image dots of the (n−1) sets of difference image dots on the visual display during a first time interval; and
   eliminating the k sets of difference image dots from the visual display after the first time interval has elapsed;
   wherein k is a positive integer and k≤(n−1).

5. The method of claim 2, wherein displaying the at least one visual pattern on the visual display according to the (n−1) sets of difference image dots comprises:
   displaying an area on the visual display according to the (n−1) sets of difference image dots wherein the area highlights the object.

6. The method of claim 2, wherein displaying the at least one visual pattern on the visual display according to the (n−1) sets of difference image dots comprises:
   displaying an area on the visual display according to k sets of difference image dots of the (n−1) sets of difference image dots during a first time interval, wherein the area highlights the object; and
   eliminating the area from the visual display after the first time interval has elapsed;
   wherein k is a positive integer and k≤(n−1).

7. The method of claim 2, wherein the n images are captured during a first time interval, and the method further comprises:
   capturing m images during a second time interval following the first time interval for obtaining m sets of image dots, wherein the object corresponds to a $p_{th}$ set of image dots in a $p_{th}$ image of the m images;
   performing (m−1) difference calculations using the m sets of image dots to obtain (m−1) sets of difference image dots, wherein a $q_{th}$ set of difference image dots of the (m−1) sets of difference image dots is generated by performing a $q_{th}$ difference calculation of the (m−1) difference calculations using a $(q+1)_{th}$ set of image dots and a $q_{th}$ set of image dots of the m sets of the image dots;

determining the object has not displaced during the second time interval when a sum of numbers of the (m−1) sets of difference image dots fails to reach a second threshold; and eliminating the visual pattern from the visual display after determining the object has not displaced during the second time interval;

wherein p, m and q are positive integers, p≤m, and q+1≤m.

8. An object displacement detection system for detecting displacement of an object, comprising:

an image capture unit configured to capture n images of the object for obtaining n sets of image dots and capture m images during a time interval for obtaining m sets of image dots corresponding to the object, wherein each image dot of the n sets of image dots comprises a pixel or a group of pixels generated from the n images, each image dot of the m sets of image dots comprises a pixel or a group of pixels generated from the m images, the object corresponds to an $i_{th}$ set of image dots in an $i_{th}$ image of the n images and the object corresponds to a $p_{th}$ set of image dots in a $p_{th}$ image of the m images;

a memory coupled to the image capture unit and configured to store the n images, a first threshold, the time interval, the m images and a second threshold; and a processor coupled to the memory and the image capture unit and configured to perform (n−1) difference calculations using the n sets of image dots to obtain (n−1) sets of difference image dots and determine whether the object has displaced and perform (m−1) difference calculations using the m sets of image dots to obtain (m−1) sets of difference image dots, wherein a $j_{th}$ set of difference image dots of the (n−1) sets of difference image dots is generated by the processor by performing a $j_{th}$ difference calculation of the (n−1) difference calculations using a $(j+1)_{th}$ set of image dots and a $j_{th}$ set of image dots of the n sets of the image dots, the processor determines that the object has displaced when a sum of numbers of the (n−1) sets of difference image dots reaches a first threshold, a $q_{th}$ set of difference image dots of the (m−1) sets of difference image dots is generated by performing a $q_{th}$ difference calculation of the (m−1) difference calculations using a $(q+1)_{th}$ set of image dots and a $q_{th}$ set of image dots of the m sets of the image dots, and the processor determines that the object has not displaced during the time interval when a sum of numbers of the (m−1) sets of difference image dots fails to reach a second threshold;

wherein i, n, j, p, m and q are positive integers, i≤n, j+1≤n, p≤m, and q+1≤m.

9. The system of claim 8 further comprising:

a display device coupled to the memory and the processor wherein the processor controls the display device to display at least one visual pattern according to the (n−1) sets of difference image dots.

10. The system of claim 8, further comprising:

a display device coupled to the memory and the processor;

wherein the processor controls the display device to display the at least one visual pattern when the processor determines the object has displaced according to the (n−1) sets of difference image dots, and the processor controls the display device to eliminate the at least one visual pattern when the processor determines the object has not displaced during the time interval according to the (m−1) sets of difference image dots.

* * * * *